(12) United States Patent
Mendez et al.

(10) Patent No.: US 10,956,971 B2
(45) Date of Patent: Mar. 23, 2021

(54) SYSTEMS AND METHODS FOR SWITCHING ELECTRONIC ACCOUNTS USING A SELF-SERVICE DEVICE

(71) Applicant: Capital One Services, LLC, McLean, VA (US)

(72) Inventors: Mark Mendez, Richmond, VA (US); Adam R. Koeppel, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 814 days.

(21) Appl. No.: 14/753,534

(22) Filed: Jun. 29, 2015

(65) Prior Publication Data

US 2016/0005113 A1 Jan. 7, 2016

Related U.S. Application Data

(60) Provisional application No. 62/021,311, filed on Jul. 7, 2014.

(51) Int. Cl.
*G06Q 40/02* (2012.01)
(52) U.S. Cl.
CPC .................. *G06Q 40/02* (2013.01)
(58) Field of Classification Search
None
See application file for complete search history.

(56) References Cited

U.S. PATENT DOCUMENTS

| | | | | |
|---|---|---|---|---|
| 7,742,986 B2 * | 6/2010 | Steele | .................... | G06Q 40/02 705/39 |
| 8,157,164 B1 * | 4/2012 | Billman | ................ | G07F 19/203 235/379 |
| 8,924,288 B1 * | 12/2014 | Easley | .................... | G06Q 30/04 705/40 |

(Continued)

OTHER PUBLICATIONS

Stango, V. (2002). Pricing with Consumer Switching Costs: Evidence from the Credit Card Market. Journal of Industrial Economics, 50(4), 475-492. (Year: 2002).*

*Primary Examiner* — Mike Anderson
*Assistant Examiner* — Bolko M Hamerski
(74) *Attorney, Agent, or Firm* — Pillsbury Winthrop Shaw Pittman LLP

(57) ABSTRACT

The disclosed embodiments include methods and systems for switching electronic accounts using self-service device. The account switch system may receive, from the self-service device, a request to switch an existing electronic account associated with a first provider to a new electronic account associated with a second provider. The account switch system may also receive, from the self-service device, information associated with the existing electronic account. The account switch system may generate the new electronic account associated with the second financial service provider and transfer data, such as funds, associated with the existing electronic account to the new electronic account. The account switch system may send information associated with the new electronic account to the self-service device, and the self-service device may provide a new account card associated with the individual and the new electronic account to the individual that is ready for use.

9 Claims, 7 Drawing Sheets

(56) References Cited

U.S. PATENT DOCUMENTS

| | | | | |
|---|---|---|---|---|
| 2005/0021456 A1* | 1/2005 | Steele | G06Q 20/10 | |
| | | | 705/39 | |
| 2008/0097882 A1* | 4/2008 | Rowe | G06Q 40/00 | |
| | | | 705/35 | |
| 2010/0004990 A1* | 1/2010 | Hazlehurst | G06Q 30/04 | |
| | | | 705/14.25 | |
| 2010/0123003 A1* | 5/2010 | Olson | G06Q 20/3574 | |
| | | | 235/380 | |
| 2011/0251883 A1* | 10/2011 | Satyavolu | H04M 15/8044 | |
| | | | 705/14.25 | |
| 2012/0078765 A1* | 3/2012 | Gopynadhan | G06Q 20/223 | |
| | | | 705/35 | |
| 2012/0203680 A1* | 8/2012 | Wehunt | G06Q 20/10 | |
| | | | 705/35 | |
| 2013/0179325 A1* | 7/2013 | Perlly | G06Q 40/025 | |
| | | | 705/38 | |
| 2014/0122213 A1* | 5/2014 | Wong | G06Q 30/0233 | |
| | | | 705/14.33 | |
| 2015/0142660 A1* | 5/2015 | Johnston | G06Q 20/023 | |
| | | | 705/44 | |

\* cited by examiner

SYSTEMS AND METHODS FOR SWITCHING
ELECTRONIC ACCOUNTS USING A
SELF-SERVICE DEVICE

PRIORITY CLAIM

This application claims priority from U.S. Provisional Application No. 62/021,311, filed Jul. 7, 2014, which is hereby incorporated by reference in the present application.

TECHNICAL FIELD

The disclosed embodiments generally relate to electronic account processing and, in particular, to methods and systems for handling customer switch of electronic accounts using a self-service device.

BACKGROUND

Currently, electronic account providers, such as banks, credit card companies, merchants, lenders, and the like, offer in-person services or online services for customers to switch their account activity from an existing provider. The current switching services typically require a customer to first open a new account with the new provider, fill out forms to transfer funds or balance from the existing financial account to the new financial account, and then close the existing financial account with the existing provider. Usually a new account card, such as a payment card, or a credit card, will be mailed to the customer after the new financial account is opened.

There are several disadvantages with the current account switching mechanism. First, it involves significant inconvenience for customers to switch financial accounts. Second, there is a delay in issuing a new account card to the customer switching financial accounts. Customers do not receive the activated account card at the moment the new account is opened. There also exists a delay in funding the new financial account when the funds are transferred from the existing financial account to the new account. Finally, customers typically must manually switch recurring transactions, such as automatic bill payment and deposit, from the prior financial account to the new financial account. Certain aspects of the disclosed embodiments provide methods and systems that enable customers to switch financial accounts in a quick and simple manner. Other aspects are also provided as disclosed below.

SUMMARY

Disclosed embodiments include systems for switching an existing financial service provider account associated with a first financial service provider to a new financial service provider account associated with a second financial service provider. The system may include one or more processors and a memory. The memory may store instructions that, when executed by the one or more processors, cause the one or more processors to perform operations including: receiving, from an self-service device, a request to switch the existing financial service provider account associated with the first financial service provider to the new financial service provider account associated with the second financial service provider; receiving, from the self-service device, information associated with the existing financial service provider account; generating, by the one or more processors, the new financial service provider account associated with the second financial service provider based at least on the received information; transferring, by the one or more processors, funds associated with the existing financial service provider account to the new financial service provider account; and sending information associated with the new financial service provider account to the self-service device.

Disclosed embodiments further include self-service devices for switching an existing financial service provider account associated with a first financial service provider to a new financial service provider account associated with a second financial service provider. The self-service device may include one or more processors and a memory. The memory may store instructions that, when executed by the one or more processors, cause the one or more processors to perform operations including: receiving a request from a user to switch the existing financial service provider account associated with the first financial service provider to the new financial service provider account associated with the second financial service provider; receiving a payment card associated with the existing financial service provider account; generating information associated with the existing financial service provider account based on the received payment card; sending, to a server associated with the second financial service provider, a request to switch from the existing financial service provider account associated with the first financial service provider to the new financial service provider account associated with the second financial service provider; receiving, from the server associated with the second financial service provider, information associated with the new financial service provider account; and providing, at the self-service device, a payment card associated with the new financial service provider account to the user.

Additional objects and advantages of the disclosed embodiments will be set forth in part in the description which follows, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed. For example, the methods relating to the disclosed embodiments may be implemented in system environments outside of the exemplary system environments disclosed herein.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Figure 1:
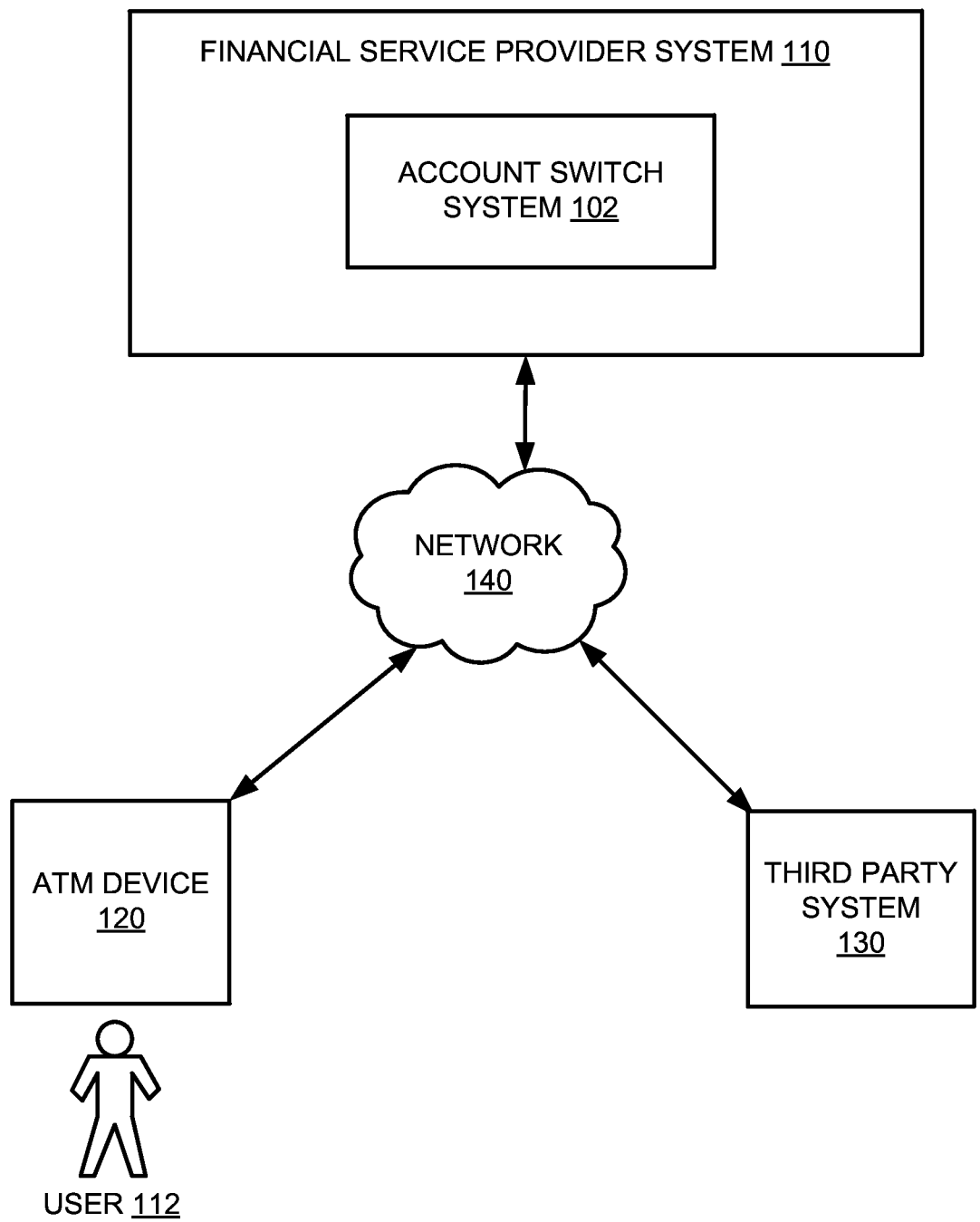
FIG. 1 is a block diagram of an exemplary system, consistent with disclosed embodiments.

FIG. 1 is a block diagram of an exemplary system 100 for performing one or more operations consistent with the disclosed embodiments. The components and arrangement shown in FIG. 1 are not intended to be limiting to the disclosed embodiment as the components used to implement the processes and features disclosed here may vary.

In accordance with certain disclosed embodiments, system 100 may include an account switch system 102, financial service provider system 110, one or more ATMs 120, one or more third-party systems 130, and network 140. The components and arrangement of the components included in system 100 may vary. Thus, system 100 may include other components that perform or assist in the performance of one or more processes consistent with the disclosed embodiments.

Financial service provider system 110 may be a system associated with a financial service provider, which may be any entity providing financial services. For example, financial service provider system 110 may be associated with a service provider such as, for example, a bank, credit card issuer, or any other type of financial service entity that generates, provides, manages, and/or maintains financial service accounts for one or more users. Financial accounts may include, for example, credit card accounts, bank accounts (e.g. checking accounts, saving accounts), loans, investment accounts, and any other type of accounts relating to financial products. In one aspect, financial service provider system 110 may provide services for switching the customers' existing financial accounts (held with a financial service provider other than the provider associated with financial service provider system 110) to new financial accounts provided by financial service provider 110.

In certain embodiments, financial service provider system 110 may include an account switch system 102. Account switch system 102 may be a computer-based system including computer system components, such as one or more servers, desktop computers, workstations, tablets, hand held computing devices, memory devices, and/or internal network(s) connecting the components. In one embodiment, account switch system 102 may be a server that includes one or more processor(s), memory devices, and interface components. Account switch system 102 may include infrastructure and components configured to generate and/or provide financial service accounts such as credit card accounts, checking accounts, debit card accounts, loyalty or reward programs, lines of credit, and the like. Account switch system 102 may also include infrastructure and components that are configured to generate and/or provide customer switch of financial service accounts associated with another provider, such as debit accounts, credit cards, etc.

Account switch system 102 may also include infrastructures and components that are configured to manage transactions associated with a customer financial service account.

In certain aspects, account switch system 102 may include one or more computing devices configured to communicate with ATM device 120 and/or third-party system 130 to perform processes associated with financial account switch. For example, account switch system 102 may include one or more computing devices configured to generate a new financial account, verifying user identify for account switching, and transfer funds and/or balances associated with a financial account provided by another financial service provider to the new financial account provided by the financial service provider associated with financial service provider system 110. In certain aspects, a financial service provider associated with account switch system 102 may be (or include a service corresponding to) a bank, a credit card company, or the like. The financial service provider may maintain financial service accounts for customers, such as checking and saving accounts, in a manner known in the art. Account switch system 102 may be configured to perform operations associated with the management of financial service accounts and may allow one or more users (e.g., customers) to participate in operations related to switching financial accounts remotely, such as via network 140.

ATM device 120 may include one or more computing devices configured to perform one or more operations consistent with disclosed embodiments. Although the present disclosure is described in connection with ATM, other electronic self-service devices that provide financial services to customers may also be used in place of ATMs. ATM device 120 may enable customers to carry out banking transactions. Examples of banking transactions include the dispensing of cash, the making of deposits, the transfer of funds between accounts, the payment of bills, the cashing of checks, the purchase of money orders, and account balance inquiries. In accordance with certain disclosed embodiments, ATM device 120 may enable customers to switch financial accounts from one provider to a new provider and dispense a new account card, such as a payment card or credit card, at the end of the automated account switch process.

ATM device 120 may communicate with financial service provider system 110 via network 140. In certain embodiments, ATM device 120 may be configured to execute instructions that perform account switching processes. For example, ATM device 120 may be configured to receive a request from a user to perform financial account switching from one provider to another provider. ATM device 120 may be configured to receive a payment card or credit card from a user and read the existing financial account information. ATM device 120 may also be configured to receive from account switch system 102 information of the new financial account for the user, and to produce and provide a new payment card or credit card associated with the new financial account and associated with user 112.

Third-party system 130 may be one or more computer systems associated with a third-party. Third-party system 130 may include one or more computing systems that are configured to perform computer-implemented processes, such as a server, desktop, laptop, mobile device, etc. Third-party system 130 may be associated with an entity that may arrange to transact with a customer. For example, third-party system 130 may be associated with an entity that receives a payment from a customer (e.g., bill payment to a merchant), delivers a payment to a customer (e.g., direct deposit from a financial service provider, such as an employer's bank), and/or processes a payment to or from a customer (e.g., ACH processing). Third party system 130 may also offer connectivity to a user's previous online bank account (e.g., accessed through input of username and password) in order to obtain transactions for use with account switch system 102.

In one example, a third-party system 130 may be associated with a merchant, such as one or more providers of goods and/or services, such as a retailer, etc. Third-party system 130 may be configured to perform financial transaction processes, such as receiving, processing, and handling payment transactions associated with the sale of goods and/or services provided by the associated merchant. Third-party system 130 may be configured to receive payments from a financial account held by a customer of financial service provider system 110. In one example, the payments may be recurring payments to the merchant associated with third-party system 130 for goods and/or services received by the customer (e.g., payments associated with a household bill, such as an electric bill). Third-party system 130 may communicate with financial service provider system 110 to allow transfer of funds from the customer account to the merchant for making one or more payments.

In another example, a third-party system 130 may be associated with a financial service provider, which may be different from the provider associated with financial service provider system 110. In one aspect, the financial service provider associated with third-party system 130 may maintain a financial account for the customer (e.g., user 112). For example, the financial account may be a credit card account. The third-party system 130 may be configured to communicate with financial service provider system 110 to allow transfer of funds from the customer account associated with financial service provider system 110 to the other customer account (held with the financial service provider associated with third-party system 130), such as for the payment of a credit card bill. In another aspect, third-party system 130 may be associated with a financial service provider configured to make payments to the customer, such as direct deposits into the customer's financial account. For example, third-party system 130 may be associated with a bank through which a customer's employer makes payments to their employees.

In yet another example, a third-party system 130 may be associated with a financial transaction processing service, such as an automated clearing house. In this instance, third-party system 130 may be configured to process transactions to send money to or from a customer's financial account. For example, third-party system 130 may be configured to receive funds from a customer account and send the funds to a merchant to make a payment owed by the customer. Similarly, third-party system 130 may be configured to receive funds from a financial service provider and send the funds to the customer's account to make a payment to the customer.

Network 140 may be any type of network that provides communications, exchanges information, and/or facilitates the exchange of information between account switch system 102, other components of financial service provider system 110, ATM device 120, and/or third-party system 130. In one embodiment, network 140 may be the Internet, a Local Area Network, or other suitable connection(s) that enables system 100 to send and receive information between the components of system 100. In other embodiments, one or more components of system 100 may communicate directly through a dedicated communication link(s) (not shown), such as links between ATM device 120, financial service provider system 110, and third-party system 130.

In one embodiment, user 112 may operate ATM device 120 to perform one or more processes associated with account switch system 102. User 112 may operate ATM device 120 to communicate with account switch system 102 to manage an account switch. An account switch may include any instance in which a customer chooses to stop use and/or close one financial account in favor of another financial account. The account switch may include switch of a single transaction normally made using one financial account to another financial account (e.g., paying a bill with a different account), switch of all transactions associated with one financial account to another financial account (e.g., switching to a new account and closing an old account), or something in-between. Transactions may include, for example, deposits into a financial account, such as a direct deposit, and/or payments made from a financial account, such as bills paid by one or more of a payment processer (e.g., ACH), a debit card, or a bill pay system. In an exemplary embodiment, a customer (e.g., user 112) may open a new financial account (e.g., a checking account) with financial service provider system 110 and switch some or all transactions from a financial account held with another financial service provider to the new account, using account switch system 102.

It should be understood that switching of transactions may refer to any process by which a current or future transaction is made through one financial account instead of another financial account. For example, switching of a transaction may refer to changing an arrangement with a third-party such that future transactions occur through one financial account different from another financial account previously used to transact with the third-party.

In executing the one or more processes associated with an account switch, account switch system 102 may communicate with other components of system 100, such as one or more third-party system 130. These communications may arrange to complete switches of transactions (e.g., bill payments, direct deposits, etc.) associated with the customer from one financial account to another financial account. For example, account switch system 102 may communicate with a third-party system 130 associated with a merchant to switch automatic recurring payments made by the customer to the merchant from one financial account (e.g., an old financial account) to another financial account (e.g., a new financial account).

In another aspect, account switch system 102 may communicate with a third-party system 130 associated with the financial service provider that maintains the financial account from which the customer is switching. For example, account switch system 102 may communicate with a financial service provider associated with the customer's previous financial account, to instruct the financial service provider to complete transactions with the previous account (e.g., pay a bill, transfer funds to the new account, stop payments, etc.). In this way, the customer may switch accounts used for transactions with third-parties through use of account switch system 102.

Figure 2:
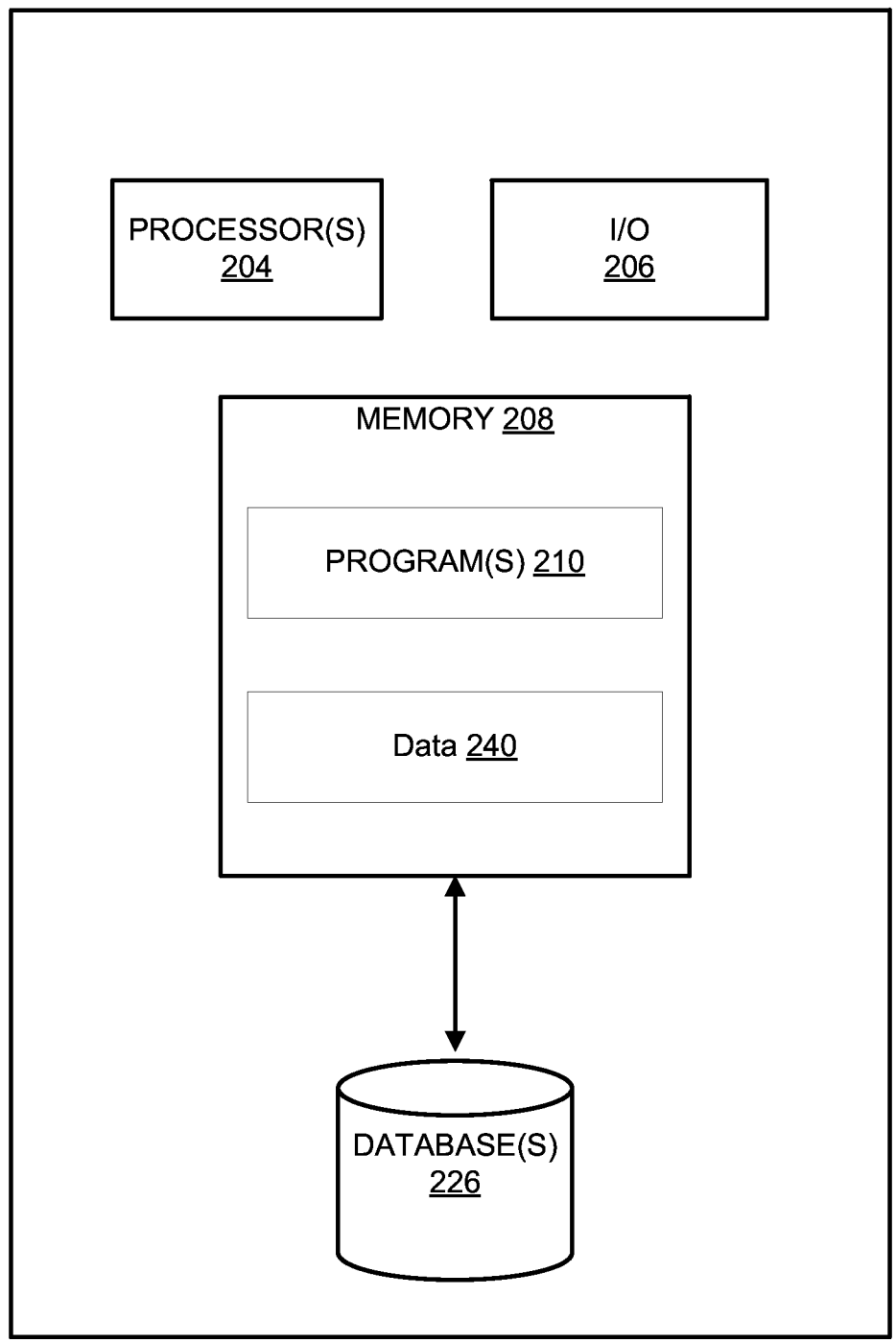
FIG. 2 is a block diagram of an exemplary server, consistent with disclosed embodiments.

FIG. 2 shows a block diagram of an exemplary server 200 for implementing embodiments consistent with the present disclosure. In an exemplary embodiment, server 200 may correspond to account switch system 102. It should be understood, however, that variations of server 200 may be used by other components of system 100, including other components of financial service provider system 110, third-party system 130, and/or ATM Device 120.

In one embodiment, server 200 may include one or more processor(s) 204, memory devices, such as memory 208, and interface components 206. Server 200 may take the form of a mobile computing device, general purpose computer, a mainframe computer, or any combination of these components. According to some embodiments, server 200 may comprise web server(s) or similar computing devices that generate, maintain, and provide web site(s) consistent with disclosed embodiments. Server 200 may be standalone, or it may be part of a subsystem, which may be part of a larger system. For example, server 200 may represent distributed servers that are remotely located and communicate over a network (e.g., network 140) or a dedicated network, such as a LAN. Server 200 may correspond to any of ATM device 120, third-party system 130, and financial service provider system 110.

Processor(s) 204 may be one or more known processing devices, such as a single core or multiple core processor system that provides the ability to perform parallel processes simultaneously. For example, processor 204 may be a single core processor that is configured with virtual processing technologies known to those skilled in the art. In certain embodiments, processor 204 may use logical processors to simultaneously execute and control multiple processes. Processor 204 may implement virtual machine technologies, or other similar known technologies to provide the ability to execute, control, run, manipulate, store, etc. multiple software processes, applications, programs, etc. In another embodiment, processor(s) 204 may include a multiple-core processor arrangement (e.g., dual or quad core) that is configured to provide parallel processing functionalities to allow card switch system 102 to execute multiple processes simultaneously. One of ordinary skill in the art would understand that other types of processor arrangements could be implemented that provide for the capabilities disclosed herein.

Memory 208 may include one or more storage devices configured to store instructions used by processor 204 to perform functions related to disclosed embodiments. For example, memory 208 may be configured with one or more software instructions, such as program(s) 210 that may perform one or more operations when executed by processor 204. The disclosed embodiments are not limited to separate programs or computers configured to perform dedicated tasks. For example, memory 208 may store a single program 210 that performs the functions of the server 200, or program 210 could comprise multiple programs. Additionally, processor 204 may execute one or more programs located remotely from server 200. For example, ATM device 120, third-party system 130, and/or financial service provider system 110, may, via server 200, access one or more remote programs that, when executed, perform functions related to certain disclosed embodiments. Memory 208 may also store data 240 that may reflect any type of information in any format that the system may use to perform operations consistent with the disclosed embodiments.

I/O devices 206 may be one or more devices configured to allow data to be received and/or transmitted by server 200. I/O devices 206 may include one or more digital and/or analog communication devices that allow server 200 to communicate with other machines and devices, such as other components of system 100.

Server 200 may also be communicatively connected to one or more database(s) 226. Server 200 may be communicatively connected to database(s) 226 through network 140. Database 226 may include one or more memory devices that store information and are accessed and/or managed through server 200. By way of example, database(s) 226 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. In one aspect, server 200 may include database 226. Alternatively, database 226 may be located remotely from the server 200. Database 226 may include computing components (e.g., database management system, database server, etc.) configured to receive and process requests for data stored in memory devices of database(s) 226 and to provide data from database 226.

Figure 3:
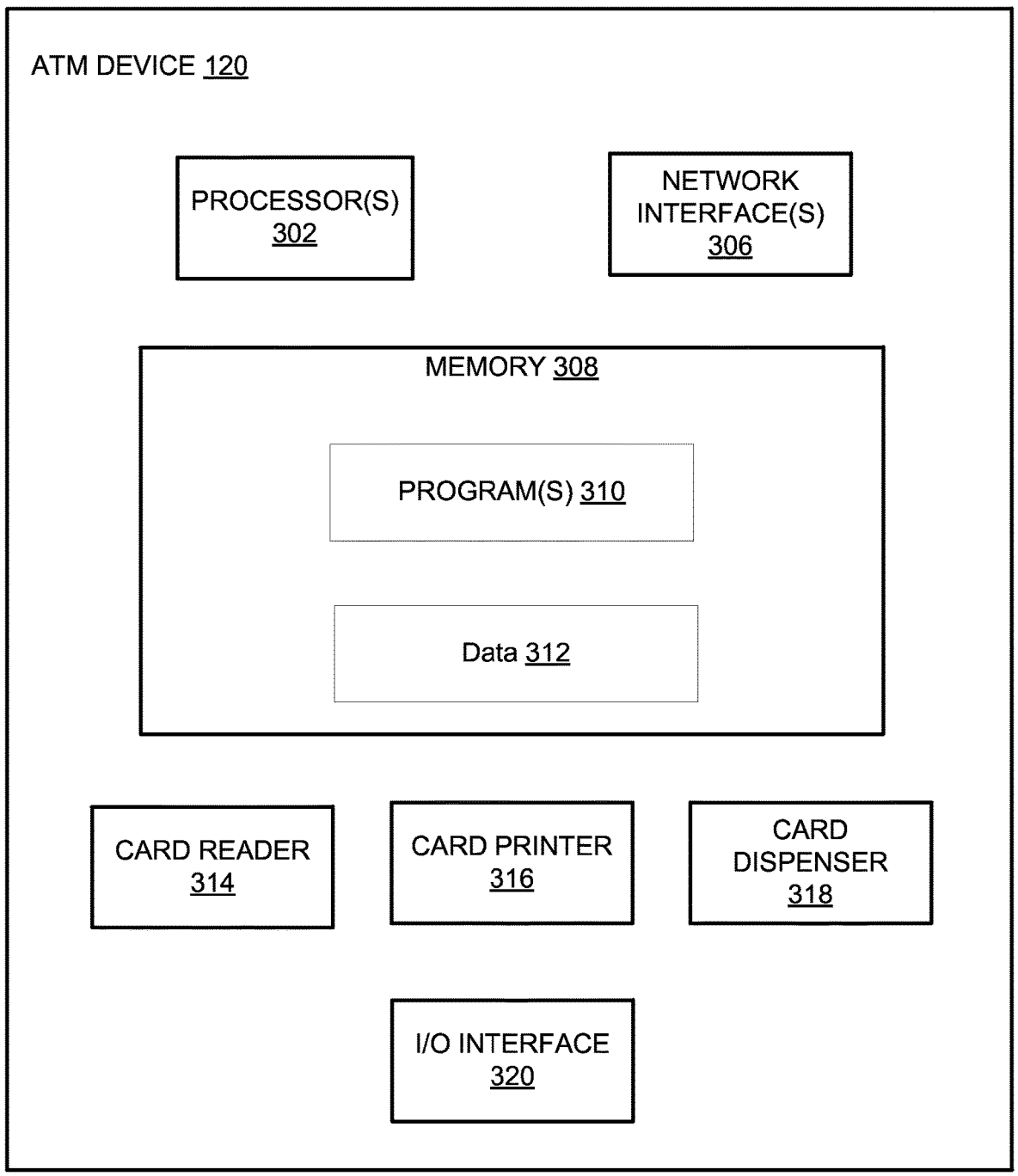
FIG. 3 is a block diagram of an exemplary ATM device, consistent with disclosed embodiments.

FIG. 3 shows an exemplary ATM device 120 consistent with disclosed embodiments. In one embodiment, ATM device 120 may include one or more processors 302, one or more network interfaces 306, one or more memories 308, card reader 314, card printer 316, card dispenser 318, and one or more input/output (I/O) devices 320. In some embodiments, ATM device 120 may comprise a camera that can be configured to capture an image of a user who is initiating a transaction with ATM device 120. ATM device 120 may be configured to send the image of the user to financial service provider system 110 for user identity verification. In some embodiments, ATM device 120 may comprise a camera that can be configured to capture an image of a payment card issued by a financial service provider, such as a bank account card or a credit card. ATM device 120 may also comprise software programs that may be configured to scan, read, and/or decode the captured image of a payment card consistent with disclosed embodiments.

Processor 302 may include one or more known single core or multiple core processor systems that provide the ability to perform parallel processes simultaneously. For example, processor 302 may be a single core processor that is configured with virtual processing technologies known to those skilled in the art. In certain embodiments, processor 302 may use logical processors to simultaneously execute and control multiple processes. Processor 302 may implement virtual machine technologies, or other similar known technologies to provide the ability to execute, control, run, manipulate, store, etc. multiple software processes, applications, programs, etc. In another embodiment, processor(s) 302 may include a multiple-core processor arrangement (e.g., dual or quad core) that is configured to provide parallel processing functionalities to allow ATM device 120 to execute multiple processes simultaneously. One of ordinary skill in the art would understand that other types of processor arrangements could be implemented that provide for the capabilities disclosed herein.

Network interface 306 may be one or more devices configured to allow data to be received and/or transmitted by ATM device 120. Network interface 306 may include one or more digital and/or analog communication devices that allow ATM device 120 to communicate with other machines and devices, such as other components of system 100. Network interface 306 may also be configured to enable a dedicated communication link(s) between ATM device 120 and financial service provider system 110.

Memory 308 may include one or more storage devices configured to store instructions used by processor 302 to perform functions related to disclosed embodiments. For example, memory 308 may be configured with one or more software instructions, such as program(s) 310 that may perform one or more operations when executed by processor 302. Memory 308 may also store data 312 that is used by one or more programs 310.

In certain embodiments, memory 310 may store software processes that may be executed by processor(s) 302 to perform one or more financial accounts switching processes consistent with disclosed embodiments. For example, memory 310 may store software processes that initiate a request with financial service provider system 110 to switch financial accounts. In certain aspects, memory 310 may store software processes that identify the existing financial account based on an account card received from a user. For instance, these software instructions may, when executed by processor(s) 302, process information related to an existing financial account and send the information to financial service provider system 110. In certain aspects, memory 310 may store software processes that receive information of a new financial account from financial service provider system 110 and produce an account card accordingly.

Card reader 314 may be configured to read magnetically encoded information on transaction instruments such as bank cards. In some embodiments, ATM device 120 may include a smart card reader, a wireless transceiver or any other suitable interface for exchanging transaction information with a transaction instrument. The transaction instrument may be a chip, an RFID tag, a smart card, a PDA, a telephone or any other suitable device.

Card printer 316 may be configured to encode the account information of the new financial account on the magnetic stripe of a payment card, such as a bank card or a credit card, and print the embossed information on a blank card. For example, card printer 316 may include a card writer that may encode part of all payment data and personal account data required to conduct transactions, such as account holder name, card account number, expiration date, security codes, encoded magnetized strip, integrated circuit cards (IC cards or "chip cards"), and/or corresponding security PIN. In certain embodiments, card printer 316 may be configured to print the embossed information on a customized card selected by a user. Card dispenser 318 may provide the user of ATM device 120 with the newly printed account card associated with financial service provider 110. Although for ease of discussion the present disclosure discusses card printer 316 in the context of printing financial payment cards employing magnetic stripes, it should be understood that, additionally or alternatively, card printer 316 may be configured to configure other payment devices. For example, card printer 316 may be configured to encode the account information of the new financial account on other types of financial service payment products, such as contactless payment solutions and the like.

I/O interface 320 may be one or more devices configured to allow data to be received and/or transmitted between ATM device 120 and user 112. I/O interface 320 may include one or more digital and/or analog devices that allow ATM device 120 to communicate with user 112. For example, I/O interface 320 may include a screen for exchanging information with user 112. I/O interface 320 may also include a keypad for the user to enter numerical and textual data. I/O interface 320 may also include one or more digital and/or analog devices that allow user 112 to interact with ATM device 120 such as a touch-sensitive area, speaker, optical scanners, or microphones. I/O interface 320 may also include other components known in the art for interacting with user 112. ATM device 120 may be configured to perform certain actions based on received input from the user, such as through detected input through I/O interface 320.

The components of ATM device 120 may be implemented in hardware, software, or a combination of both hardware and software, as will be apparent to those skilled in the art.

Figure 4:
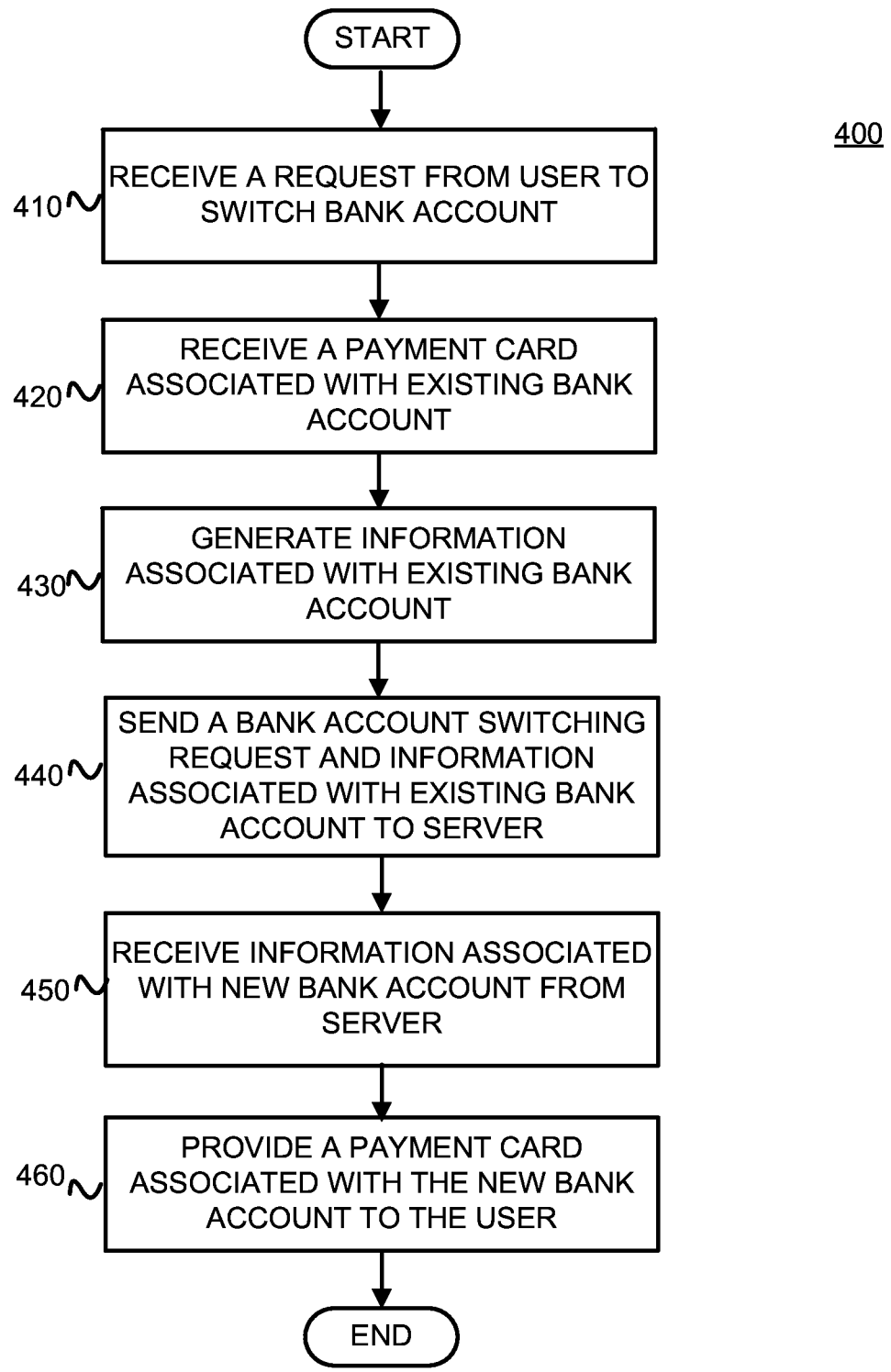
FIG. 4 is a flowchart of an exemplary bank account switching process at an ATM, consistent with disclosed embodiments.

FIG. 4 shows a flowchart of an exemplary bank account switching process 400 at an ATM device, consistent with disclosed embodiments. In step 410, ATM device 120 may receive a request from user 112 to switch bank account via I/O interface 320. For example, ATM device 120 may be configured to receive a user input from a touch-screen display indicating that the user desires to switch an existing bank account associated with a service provider to a new bank account associated with another service provider. ATM device 120 may also be configured to receive the user input from a keyboard or keypad input, or from a voice input via a microphone, or a combination of these. In certain embodiments, ATM device 120 may cause a display to be presented to the customer presenting the customer with transaction options available (such as, switch bank accounts, withdraw funds, make a balance inquiry, make a funds transfer, transfer funds to another account holder, etc.).

In step 420, ATM device 120 may receive a payment card associated with the existing bank account from user 112 via I/O interface 320. For example, ATM device 120 may be configured to receive a payment card via a card reader port. In one aspect, ATM device 120 may be configured to prompt user 112 to provide the payment card associated with the existing bank account after receiving the user request to switch bank account. For example, ATM device 120 may prompt user 112 to provide the payment card associated with the existing bank account by displaying a message on the screen. For another example, ATM device 120 may prompt user 112 to provide the payment card associated with the existing bank account by outputting a voice message via a speaker of ATM device 120.

In step 430, ATM device 120 may generate information associated with the existing bank account based on the received payment card. For example, the card reader of ATM device 120 may read magnetically encoded information on the payment card and generate the account information associated with the payment card, such as account number, account type, cardholder data, identity of the card account provider, etc. In certain embodiments, ATM device 120 may be configured to collect additional information associated with the existing bank account via I/O interface 320. For example, ATM device 120 may be configured to prompt the user to enter additional information associated with the existing bank account through a touch-screen display, a keypad, a keyboard, a voice input, or the like. The additional information to be entered by user 112 may include the cardholder's identity, the account history of the existing bank account, whether the user wishes to transfer all the remaining funds in the existing bank account to the new bank account, whether the user wishes to set up automatic bill payment with the new bank account, any passcode associated with the existing bank account, etc.

In step 440, ATM device 120 may send a bank account switching request and the information associated with the existing bank account to a server of the financial service provider system that the new bank account is associated with. For example, ATM device 120 may be configured to identify a network address associated with a server associated with the new financial service provider. The new financial service provider may be associated with financial service provider system 110. The new financial service provider may or may not be the same provider as that of the ATM device 120. For another example, ATM device 120 may be configured to send the bank account switching request, the account number of the existing bank account, and the identity of the cardholder, to financial service provider system 110. ATM device 120 may also be configured to receive request from financial service provider system 110 to collect additional information from user 112. In response, ATM device 120 may be configured to prompt user 112 to enter the additional information required by financial service provider system 110.

In certain embodiments, ATM device 120 may send data associated with user identity to financial service provider system 110 for verification of user identity. The user identity data includes, for example, an image captured by a camera of ATM device 120, an identity card provided by user 112 (such as a driver license or the like), biometric data entered by user 112, etc. ATM device 120 may be configured to receive, from financial service provider system 110, whether the identity of the user is verified. For example, financial service provider system 110 may compare the received user identity data with the data stored in a database (whether accessible internally or externally through a third-party), and determine whether the received user identity data matches the data stored in a database. If ATM device 120 receives an indication from financial service provider system 110 that the user identity cannot be verified, ATM device 120 may proceed to terminate the account switching process with user 112 or prompt user 112 to provide additional information for identity verification. On the other hand, if ATM device 120 receives an indication from financial service provider system 110 that the user identity is verified, ATM device 120 may proceed to continue the account switching process with user 112.

In step 450, ATM device 120 may receive information associated with a new bank account from a server of financial service provider system 110. The operations with respect to creating the new bank account at financial service provider system 110 will be described in connection with FIG. 5. In one embodiment, the information associated with the new bank account may include account number of the new bank account, expiration date of a new payment card, available funds in the new bank account, etc. In one example, ATM device 120 may present user 112 via a display screen one or more interfaces that enable user 112 to view and/or configure the new bank account. For example, ATM device 120 may present user 112 with the new account information, such as the available funds in the new bank account, account number associated with the new bank account, expiration date of the new payment card, etc. ATM device 120 may present user 112 via a display screen one or more interfaces that enable user 112 to withdraw funds from the new bank account, make deposit to the new bank account, transfer funds to/from the new bank account, etc. Additionally, ATM device 120 may present user 112 via a display screen one or more interfaces that enable user 112 to set up automatic bill payment or deposit associated with the new bank account. For example, ATM device 120 may allow user 112 to select whether to transfer some or all of the automatic bill payment and/or deposit associated with the previous bank account to the new bank account. ATM device 120 may allow user 112 to add new entry of automatic bill payment and/or deposit to the new bank account.

In step 460, ATM device 120 may provide a payment card associated with the new bank account to the user. ATM device 120 may encode the data associated with the new bank account on the magnetic stripe of the new payment card. ATM device 120 may also be configured to emboss the new payment card with the account number of the new bank account, expiration date of the new payment card, cardholder's name, etc. ATM device 120 may print the new payment card and provide it to the user through card dispenser 318. In certain embodiments, ATM device 120 may present user 112 via a display screen one or more interfaces that enable user 112 to select a customized design of the new payment card. The new payment card may be activated for subsequent purchases by financial service provider system 110 before or when the new payment card is provided to user 112. The disclosed embodiments may enable user 112 to use the new payment card for purchases or other transactions immediately after the ATM device 120 produces the new payment card. In some embodiments, ATM device 120 may present user 112 via a display screen one or more interfaces that enable user 112 to request additional payment cards with the new bank account. For example, ATM device 120 may allow user to add a co-owner for the new bank account. Accordingly, ATM device 120 may produce and provide an additional payment card with a different cardholder name to user 112. In certain embodiments, ATM device 120 may present user 112 via a display screen one or more interfaces that enable user 112 to request to mail the new payment card to user. For example, if a desired design of payment card is not available at ATM device 120, ATM device 120 may be configured to send a request to financial service provider system 110 for mailing a new payment card with a selected design to user 112.

Figure 5:
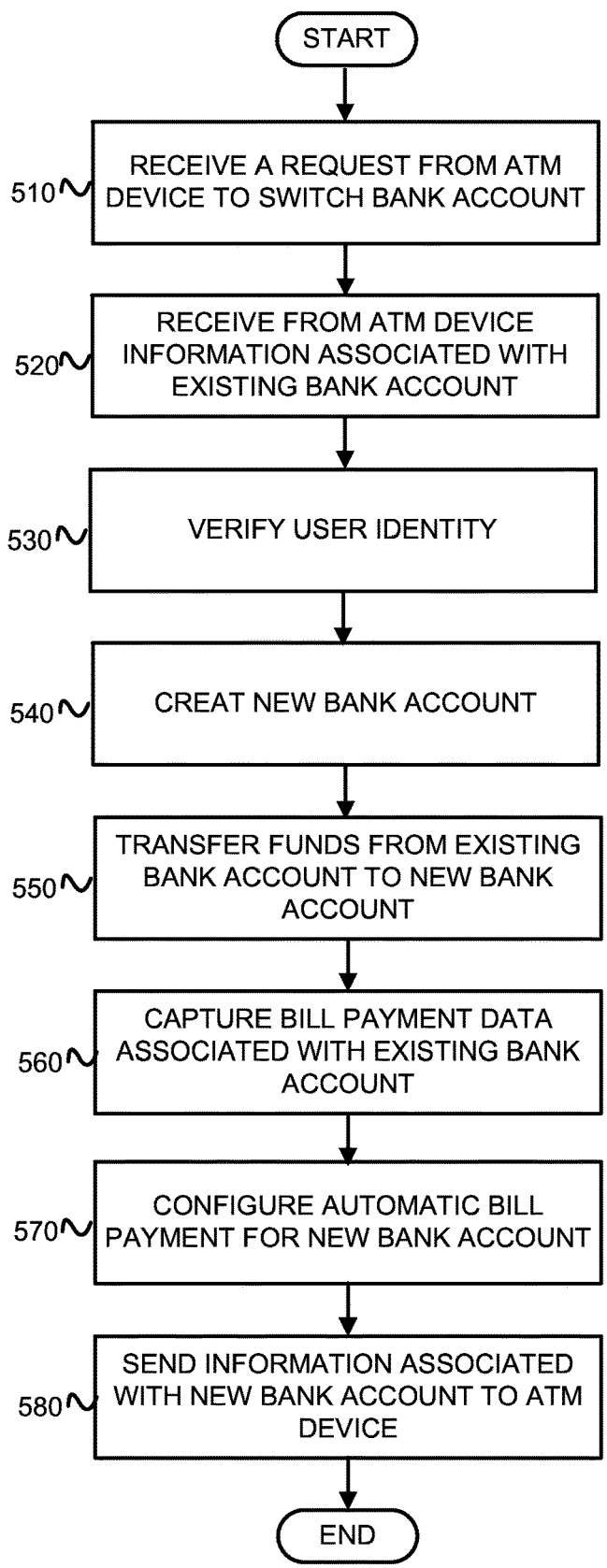
FIG. 5 is a flowchart of an exemplary bank account switching process at a financial service provider system, consistent with disclosed embodiments.

FIG. 5 is a flowchart of an account switching process performed at a server of financial service provider system 110 consistent with the disclosed embodiments. At step 510, financial service provider system 110 may receive a request from ATM 120 to switch bank account for user 112. In one example, the request may indicate that a user desires to open a new bank account with financial service provider system 110 and to transfer the available funds and automatic bill payment and deposit associated with an existing bank account with another provider to the new bank account. In other embodiments, financial service provider system 110 may receive a request from a mobile device associated with user 112, indicating that user 112 desires to switch from an existing bank account to a new account with financial service provider system 110. For example, the mobile device may be configured to execute software instructions that send an electronic request to financial service provider system 110 for bank account switching.

At step 520, financial service provider system 110 may receive information associated with the existing bank account from ATM device 120. In some embodiments, financial service provider system 110 may receive from ATM device 120 the account number, the provider associated with the existing bank account, name of the cardholder, etc. Financial service provider system 110 may receive from ATM device 120 user identity information, for example, an image of user 112 captured by a camera of ATM device 120, an identity card provided by user 112 (such as a driver license or the like), or biometric data entered by user 112. In other embodiments, financial service provider system 110 may receive from a mobile device a photo of a payment card associated with the existing bank account. For example, the mobile device may be configured to execute software instructions that take a photo of a payment card associated with the existing bank account via a camera and send the photo to financial service provider system 110 for bank account switching. For another example, the mobile device may be configured to execute software instructions that read data of the payment card associated with the existing bank account via a card reader, and then send the data associated with the existing bank account to financial service provider system 110 for bank account switching.

At step 530, financial service provider system 110 may verify user identity based on the received information from ATM device 120 (and/or the mobile phone). For example, financial service provider system 110 may compare the received user identity data with the data stored in a database, and determine whether the received user identity data matches the data stored in a database. If financial service provider system 110 determines that the received user identity data matches the data stored in the database, financial service provider system 110 may send an indication to ATM device 120 (and/or mobile phone) indicating that the user identity is verified. If financial service provider system 110 determines that the received user identity data does not match the data stored in the database, financial service provider system 110 may send an indication to ATM device 120 (and/or the mobile phone) indicating that the user identity cannot be verified and that the account switching process is terminated. In some embodiments, financial service provider system 110 may request ATM device 120 (and/or mobile phone) to obtain additional user information for identity verification. If the user identity is verified, financial service provider system 110 may proceed to continue the account switching process for user 112.

In some embodiments, financial service provider system 110 may also validate the user identity by comparing user identity to prohibited lists as determined by laws and regulations. If the user is found on the prohibited lists, financial service provider system 110 may send an indication to ATM device 120 (and/or the mobile phone) indicating that the user identity cannot be validated and that the account switching process is terminated. If the user identity is validated, financial service provider system 110 may proceed to continue the account switching process for user 112.

At step 540, financial service provider system 110 may proceed to create a new bank account. The new bank account may be created in accordance with certain request received at ATM 120 by user input. For example, the new bank account may be a checking account, a saving account, a special checking account without monthly fees, a special checking account authorizing a number of free transactions per month, etc. At step 550, financial service provider system 110 may transfer data, such as funds, from existing bank account to the new bank account. In some embodiments, financial service provider system 110 may transfer all available funds in the existing bank account to the new bank account. In some embodiments, financial service provider system 110 may receive a user selected amount of funds from ATM device 120, and financial service provider system 110 may transfer the selected amount of funds from the existing bank account to the new bank account. In some embodiments, financial service provider system 110 may determine whether the account terms associated with the new bank account, such as fee terms, interest rates, reward benefits, are more favorable compared to the account terms associated with the existing bank account. For example, if the account terms associated with the new bank account are equally or less favorable than the account terms associated with the existing bank account, financial service provider system 110 may adjust the account terms associated with the new bank account such that they are more favorable than the account terms associated with the existing bank account.

At step 560, financial service provider system 110 may capture bill payment data associated with the existing bank account. In one example, financial service provider system 110 may communicate with third-party system 130 to retrieve a transaction list of the existing bank account. Financial service provider system 110 may send a request along with information of the existing bank account to third-party system 130 to retrieve past transaction activities associated with the existing bank account during a past time duration, for example, for the last six months. Subsequently, financial service provider system 110 may receive from third-party system 130 a list of transactions associated with the existing bank account that occurred during the specified time period. Third-party system 130 may be one or more computer systems associated with the existing bank account, entities that receive a payment from the existing bank account, entities that deliver a payment to the existing bank account, and/or entities that process a payment to or from the existing bank account. Financial service provider system 110 may execute software processes to identify automatic bill payment based on the transaction history of the existing bank account. In another example, financial service provider system 110 may receive automatic bill payment information associated with the existing bank account directly from third-party system 130. In some embodiments, financial service provider system 110 may receive automatic bill payment information associated with the existing bank account from ATM device 120 which may receive the automatic bill payment information from user 112 via I/O interface 320.

At step 570, financial service provider system 110 may configure automatic bill payment and/or deposit for the new bank account. In one example, financial service provider system 110 may communicate with third-party system 130 to switch future payments or deposits associated with the existing bank account to the new bank account that has been opened. In some embodiments, financial service provider system 110 may request for user confirmation via ATM device 120 (and/or a mobile device operated by the user) for switching the future payments or deposits to the new bank account. Financial service provider system 110 may receive an indication from third-party system 130 that the account switching is complete. In some embodiments, financial service provider system 110 may configure the new bank account with all automatic bill payments and/or deposits associated with the existing bank account. In other embodiments, financial service provider system 110 may configure the new bank account with certain automatic bill payments and/or deposits associated with the existing bank account that may be selected by user 112. In some embodiments, financial service provider system 110 may send a notification to ATM device 120 indicating that certain or all automatic bill payments and/or deposits associated with the existing bank account are switched to the new bank account.

At step 580, financial service provider system 110 may send information associated with the new bank account, such as account number, cardholder's name, account type (checking, saving, etc.), expiration date of the new payment card, to ATM device 120. Financial service provider system 110 may subsequently receive an acknowledgement message from ATM device 120 indicating that the new payment card is produced and delivered to user 112. In some embodiments, financial service provider system 110 may receive a message from ATM device 120 indicating that ATM device 120 is unable to produce the new payment card associated with the new bank account. Consequently, financial service provider system 110 may execute processes that are configured to produce the new payment card and mail it to user 112.

Figure 6:
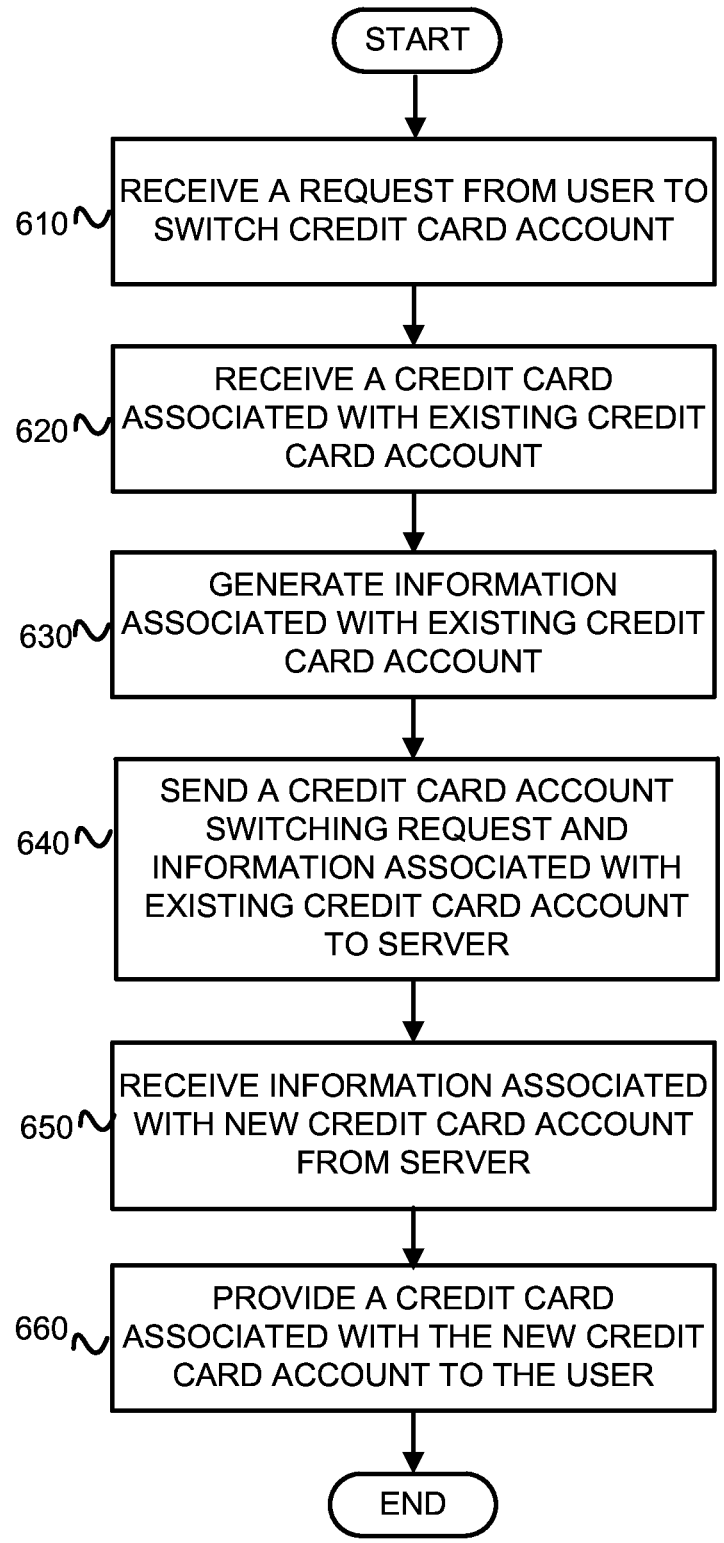
FIG. 6 is a flowchart of an exemplary credit card account switching process at an ATM, consistent with disclosed embodiments.

FIG. 6 is a flowchart of an exemplary credit card account switching process at an ATM, consistent with disclosed embodiments. In step 610, ATM device 120 may receive a request from user 112 to switch credit card account via I/O interface 320. For example, ATM device 120 may be configured to receive a user input from a touch-screen display indicating that the user desires to switch an existing credit card account associated with a service provider to a new credit card account associated with another service provider. ATM device 120 may also be configured to receive the user input from a keyboard or keypad input, or from a voice input via a microphone, or a combination of these. In certain embodiments, ATM device 120 may cause a display to be presented to the customer presenting the customer with transaction options available (such as, for example, switching credit card accounts, withdrawing funds, making a balance inquiry, making a funds transfer, transferring funds to another account holder, etc.).

In step 620, ATM device 120 may receive a credit card associated with the existing credit card account from user 112 via I/O interface 320. For example, ATM device 120 may be configured to receive a credit card via a card reader port. In one aspect, ATM device 120 may be configured to prompt user 112 to provide the credit card associated with the existing credit card account after receiving the user request to switch credit card account. For example, ATM device 120 may prompt user 112 to provide the credit card associated with the existing credit card account by displaying a message on the screen. For another example, ATM device 120 may prompt user 112 to provide the credit card associated with the existing credit card account by outputting a voice message via a speaker of ATM device 120.

In step 630, ATM device 120 may generate information associated with the existing credit card account based on the received credit card. For example, the card reader of ATM device 120 may read magnetically encoded information on the credit card and generate the account information associated with the credit card, such as account number, credit card type (such as Visa, Mastercard, American Express, etc.), cardholder data, identity of the card account provider, etc. In certain embodiments, ATM device 120 may be configured to collect additional information associated with the existing credit card account via I/O interface 320. For example, ATM device 120 may be configured to prompt the user to enter additional information associated with the existing credit card account through a touch-screen display, a keypad, a keyboard, a voice input, or the like. The additional information to be entered by user 112 may include the cardholder's identity, the account history of the existing credit card account, whether the user wishes to transfer all the outstanding balances in the existing credit card account to the new credit card account, etc.

In step 640, ATM device 120 may send a credit card account switching request and the information associated with the existing credit card account to a server of the financial service provider system that the new credit card account is associated with. For example, ATM device 120 may be configured to identify a network address associated with a server associated with the new financial service provider. The new financial service provider may be associated with financial service provider system 110. The new financial service provider may or may not be the same provider as that of the ATM device 120. For another example, ATM device 120 may be configured to send the credit card account switching request, the account number of the existing credit card account, and the identity of the cardholder, to financial service provider system 110. ATM device 120 may also be configured to receive request from financial service provider system 110 to collect additional information from user 112. In response, ATM device 120 may be configured to prompt user 112 to enter the additional information required by financial service provider system 110.

In certain embodiments, ATM device 120 may send data associated with user 112's identity to financial service provider system 110 for verification of user identity. The user identity data includes, for example, an image captured by a camera of ATM device 120, an identity card provided by user 112 (such as a driver license or the like), or biometric data entered by user 112. ATM device 120 may be configured to receive, from financial service provider system 110, an indication of whether the identity of the user is verified. For example, financial service provider system 110 may compare the received user identity data with the data stored in a database (whether accessible internally or externally through a third-party), and determine whether the received user identity data matches the data stored in a database. If ATM device 120 receives an indication from financial service provider system 110 that the user identity cannot be verified, ATM device 120 may proceed to terminate the account switching process with user 112 or prompt user 112 to provide additional information for identity verification. On the other hand, if ATM device 120 receives an indication from financial service provider system 110 that the user identity is verified, ATM device 120 may proceed to continue the account switching process with user 112.

In step 650, ATM device 120 may receive information associated with new credit card account from a server of financial service provider system 110. The operations with respect to creating the new credit card account at financial service provider system 110 will be described in connection with FIG. 7. In one embodiment, the information associated with the new credit card account may include the account number of the new credit card account, expiration date of a new credit card, credit terms of the new credit card account, etc. The credit terms of the new credit card account may include a credit limit, rewards benefits, interest rates, interest charges, fee terms, payment terms, and/or the like. In one example, ATM device 120 may present user 112 via a display screen one or more interfaces that enable user 112 to view and/or configure the new credit card account. For example, ATM device 120 may present user 112 with the new account information, such as the credit limit and/or outstanding balances in the new credit card account, account number associated with the new credit card account, expiration date of the new credit card, etc. ATM device 120 may present user 112 via a display screen one or more interfaces that enable user 112 to request cash advance from the new credit card account, make payments to the new credit card account, etc. Additionally, ATM device 120 may present user 112 via a display screen one or more interfaces that enable user 112 to set up automatic payment associated with the new credit card account. ATM device 120 may also present user 112 via a display screen one or more interfaces that enable user 112 to select features associated with the new credit card account, such as the statement closing date.

In step 660, ATM device 120 may provide a credit card associated with the new credit card account to the user. ATM device 120 may encode the data associated with the new credit card account on the magnetic stripe of the new credit card. For example, ATM device 120 may encode part of all payment data and personal account data required to conduct transactions, such as account holder name, card account number, expiration date, security codes, encoded magnetized strip, integrated circuit cards (IC cards or "chip cards"), and/or corresponding security PIN. ATM device 120 may also be configured to emboss the new credit card with the account number of the new credit card account, expiration date of the new credit card, cardholder's name, etc. ATM device 120 may print the new credit card and provide it to the user through the card dispenser. In certain embodiments, ATM device 120 may present user 112 via a display screen one or more interfaces that enable user 112 to select a customized design of the new credit card. The new credit card may be activated for subsequent purchases by financial service provider system 110 before or when the new credit card is provided to user 112. The disclosed embodiments may enable user 112 to use the new credit card for purchases or other transactions immediately after the ATM device 120 produces the new credit card. In some embodiments, ATM device 120 may present user 112 via a display screen one or more interfaces that enable user 112 to request additional credit card with the new credit card account. For example, ATM device 120 may allow user to add a joint account holder for the new credit card account. Accordingly, ATM device 120 may produce and provide an additional credit card with a different cardholder name to user 112. In certain embodiments, ATM device 120 may present user 112 via a display screen one or more interfaces that enable user 112 to request to mail the new credit card to user. For example, if a desired design of credit card is not available at ATM device 120, ATM device 120 may be configured to send a request to financial service provider system 110 for mailing a new credit card with a selected design to user 112.

Figure 7:
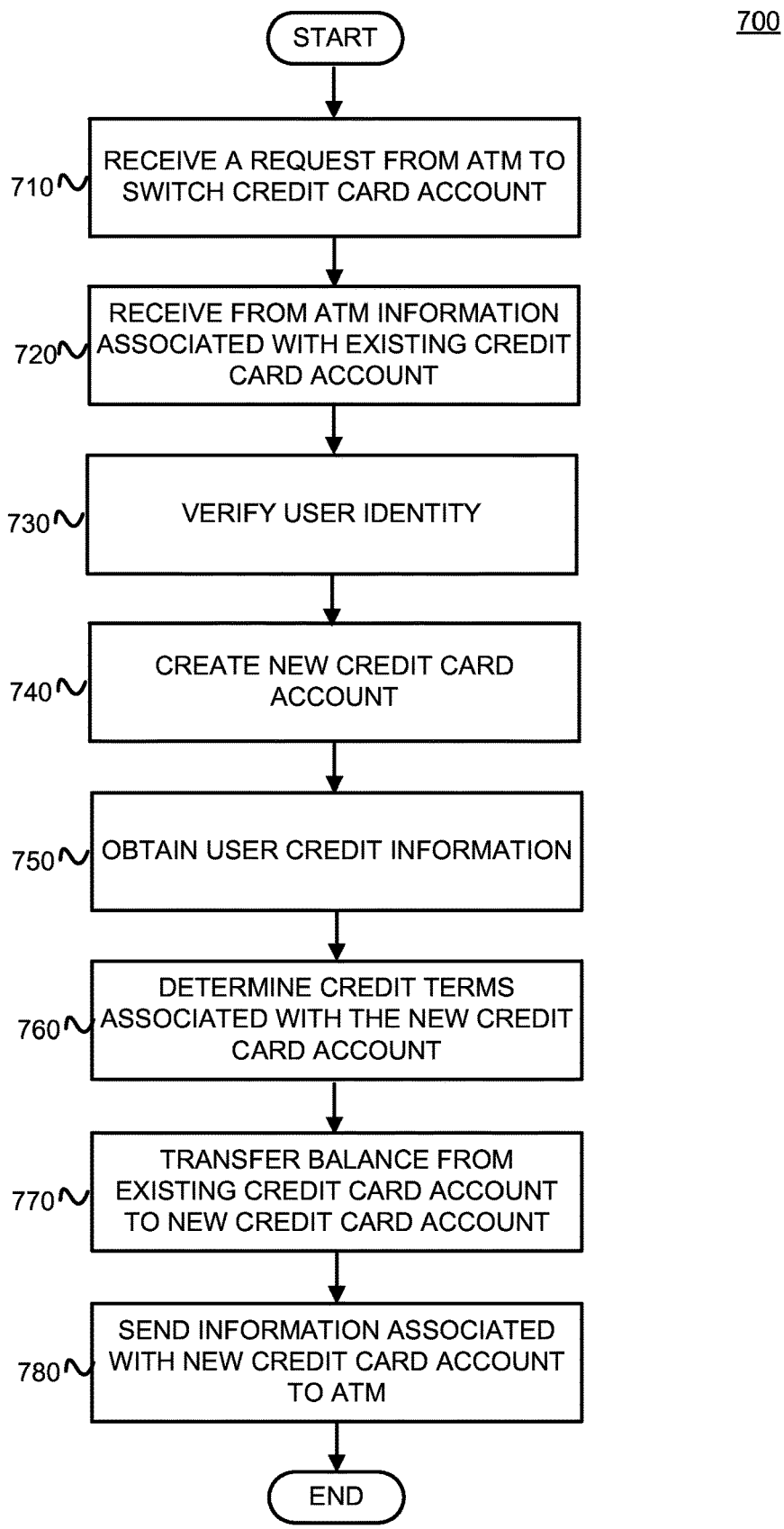
FIG. 7 is a flowchart of an exemplary credit card account switching process at a financial service provider system, consistent with disclosed embodiments.

FIG. 7 is a flowchart of an exemplary credit card account switching process at a financial service provider system 110, consistent with disclosed embodiments. At step 710, financial service provider system 110 may receive a request from ATM 120 to switch credit card account for user 112. In one example, the request may indicate that a user desires to open a new credit card account with financial service provider system 110 and to transfer the outstanding balances associated with an existing credit card account to the new credit card account. In some embodiments, financial service provider system 110 may receive a request from a mobile device associated with user 112, indicating that user 112 desires to switch from an existing credit card account to a new account with financial service provider system 110. For example, the mobile device may be configured to execute software instructions that send an electronic request to financial service provider system 110 for credit card account switching.

At step 720, financial service provider system 110 may receive information associated with the existing credit card account from ATM device 120 (and/or the mobile phone). In some embodiments, financial service provider system 110 may receive from ATM device 120 the account number, the provider associated with the existing credit card account, name of the cardholder, etc. Financial service provider system 110 may receive from ATM device 120 user identity information, for example, an image of user 112 captured by a camera of ATM device 120, an identity card provided by user 112 (such as a driver license or the like), or biometric data entered by user 112. In other embodiments, financial service provider system 110 may receive from a mobile device a photo of a credit card associated with the existing credit card account. For example, the mobile device may be configured to execute software instructions that take a photo of a credit card associated with the existing credit card account via a camera and send the photo to financial service provider system 110 for credit card account switching. For another example, the mobile device may be configured to execute software instructions that read data of the credit card associated with the existing credit card account via a card reader, and then send the data associated with the existing credit card account to financial service provider system 110 for credit card account switching.

At step 730, financial service provider system 110 may verify user 112's identity based on the received information from ATM device 120 (and/or the mobile phone). For example, financial service provider system 110 may compare the received user identity data with the data stored in a database (whether accessible internally or externally through a third-party), and determine whether the received user identity data matches the data stored in a database. If financial service provider system 110 determines that the received user identity data matches the data stored in the database, financial service provider system 110 may send an indication to ATM device 120 indicating that the user identity is verified. If financial service provider system 110 determines that the received user identity data does not match the data stored in the database, financial service provider system 110 may send an indication to ATM device 120 indicating that the user identity cannot be verified and that the account switching process is terminated. In some embodiments, financial service provider system 110 may request ATM device 120 to obtain additional user information for identity verification. If the user identity is verified, financial service provider system 110 may proceed to continue the account switching process for user 112.

In some embodiments, financial service provider system 110 may also validate the user identity by comparing user identity to prohibited lists as determined by laws and regulations. If the user is found on the prohibited lists, financial service provider system 110 may send an indication to ATM device 120 (and/or the mobile phone) indicating that the user identity cannot be validated and that the account switching process is terminated. If the user identity is validated, financial service provider system 110 may proceed to continue the account switching process for user 112.

At step 740, financial service provider system 110 may proceed to create a new credit card account. The new credit card account may be created in accordance with certain request received at ATM 120 by user input. For example, the new credit card account may be an account with no annual fees, or an account with rewards program, etc. At step 750, financial service provider system 110 may obtain user credit information via third-party system 130. In some embodiments, financial service provider system 110 may obtain income associated with user 112, credit history associated user 112, user's current credit score, etc. For example, financial service provider system 110 may send a request to third-party system 130 requesting credit information of user 112, and may subsequently receive the requested information from third-party system 130. Financial service provider system 110 may determine the credit worthiness of user 112 based on the obtained user credit information. For example, financial service provider system 110 may determine whether user 112 qualifies for a new credit card account based on the obtained user credit information. If financial service provider system 110 determines that user 112 does not qualify for a new credit card account, financial service provider system 110 may terminate the account switching process. Financial service provider system 110 may send an indication to ATM device 120 (and/or the mobile phone) indicating that user 112 does not qualify for a new credit card account with financial service provider system 110.

At step 760, financial service provider system 110 may determine the credit terms associated with the new credit card account. The credit terms associated with the new credit card account may include a credit limit, rewards benefits, interest rates, interest charges, fee terms, payment terms, and/or the like. For example, financial service provider system 110 may determine the credit terms based on credit terms of the existing credit card account, user income, credit score of the user, and/or credit history of the user, etc. In some embodiments, financial service provider system 110 may determine whether the credit terms associated with the new credit card account are more favorable compared to the credit terms associated with the existing credit card account. For example, if the credit terms associated with the new credit card account are equally or less favorable than the credit terms associated with the existing credit card account, financial service provider system 110 may adjust the credit terms associated with the new credit card account such that they are more favorable than the credit terms associated with the existing credit card account. In some embodiments, financial service provider system 110 may receive a user requested amount of credit limit from ATM device 120, and financial service provider system 110 may determine whether to approve the requested credit limit for the new credit card account.

At step 770, financial service provider system 110 may transfer balance from the existing credit card account to the new credit card account. In some embodiments, financial service provider system 110 may transfer all outstanding balances in the existing credit card account to the new credit card account. In some embodiments, financial service provider system 110 may receive a user selected amount of balances from ATM device 120, and financial service provider system 110 may transfer the selected amount of balances from the existing credit card account to the new credit card account.

At step 780, financial service provider system 110 may send information associated with the new credit card account, such as account number, cardholder's name, credit limit, expiration date of the new credit card, to ATM device 120. Financial service provider system 110 may subsequently receive an acknowledgement message from ATM device 120 indicating that the new credit card is produced and delivered to user 112 (step not shown in figure). In some embodiments, financial service provider system 110 may receive a message from ATM device 120 indicating that ATM device 120 is unable to produce the new credit card associated with the new credit card account. Consequently, financial service provider system 110 may execute processes that are configured to produce the new credit card and mail it to user 112.

The disclosed embodiments may allow a user to switch from an existing financial account to a new financial account using self-service devices such as ATM devices. Further, a new account card, such as a payment card or credit card associated with the new financial account, may be assigned to user 112, activated and issued at the ATM device during the switch transaction. In this way, customers may switch an existing financial account to a new financial account in a simple and quick manner.

The exemplary disclosed embodiments describe systems and methods for handling switching of financial accounts using ATM devices. The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

It is intended that the specification and examples be considered as exemplary only, with a true scope and spirit of the disclosed embodiments being indicated by the following claims. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. An automated teller machine ("ATM") for use in switching an existing electronic account associated with a first provider to a new electronic account associated with a second provider, comprising:
   a card reader;
   a keypad;
   a camera;
   a card printer;
   card dispenser;
   one or more processors; and
   a memory storing instructions that, when executed by the one or more processors, cause the one or more processors to perform operations including:
      receiving, using the keypad, a request from a user to switch the existing electronic account associated with the first provider to the new electronic account associated with the second provider;
      receiving identification information associated with the existing electronic account, wherein the identification information comprises at least an image of the user received via the camera, a biometric scan of the user received via the keypad, or an account card received via the card reader;
      receiving, from a mobile device associated with the user, data associated with the existing user account, or data associated with a user personal identification document;
      automatically prompting the user to switch the existing electronic account associated with the first provider to the new electronic account associated with the second provider;
      validating the user identification information by comparing the account information, the identification information, and the data to a prohibited list;
      identifying the second provider based on a network address associated with a server associated with the second provider;
      sending the validated identification information to the server associated with the identified second provider;

receiving an indication, from the second provider, that the second provider verified the user based at least on the validated identification information;
generating information associated with the existing electronic account at the second provider by:
  determining one or more credit terms associated with the new credit account based on the validated identification information and the received indication,
  comparing the one or more credit terms associated with the new credit account with one or more credit terms associated with the existing electronic account, and
  modifying the determined one or more credit terms associated with the new credit account based on the comparison;
sending, to the server associated with the second provider, a request to switch from the existing electronic account associated with the first provider to the new electronic account associated with the second provider;
receiving, from the server associated with the second provider, information associated with the new electronic account; and
providing, using the card dispenser, an account card associated with the user and the new electronic account to the user, wherein the account card is generated using the card printer.

2. The ATM of claim 1, wherein receiving a request from a user to switch the existing electronic account comprises a request from the user to switch an existing credit card account associated with the first provider to a new credit card account associated with the second provider, and wherein the memory stores instructions that, when executed by the one or more processors, cause the one or more processors to further perform operations including:
  receiving a credit card associated with the existing credit card account;
  generating information associated with the existing credit card account at the second provider based on the received credit card;
  sending, to the server associated with the second provider, a request to switch from the existing credit card account associated with the first provider to the new credit card account associated with the second provider;
  receiving, from the server associated with the second provider, information associated with the new credit card account; and
  providing, at the ATM, a credit card associated with the new credit card account to the user.

3. The ATM of claim 2, wherein the information associated with the new credit card account received from the server includes one or more credit terms of the new credit card account.

4. The ATM of claim 3, wherein the one or more credit terms of the new credit card account includes at least one of: a credit limit, reward benefits, interest rates, fee terms, and payment terms of the new credit card account.

5. The ATM of claim 1, wherein the account card associated with the new electronic account is activated for subsequent payment transactions at the time the card is provided.

6. The ATM of claim 1, wherein the ATM includes a card dispenser for providing the account card associated with the new electronic account to the user.

7. The ATM of claim 1, wherein the ATM includes a card writer for encoding data associated with the new electronic account on a magnetic stripe of the account card associated with the new electronic account.

8. The ATM of claim 7, wherein the card writer is configured to encode on the magnetic stripe of the account card at least one of: an account holder name, a card account number, an expiration date, a security code, or a security PIN.

9. The ATM of claim 1, wherein the ATM includes a user interface configured to gather additional information associated with the existing electronic account.

* * * * *